Figure 5:
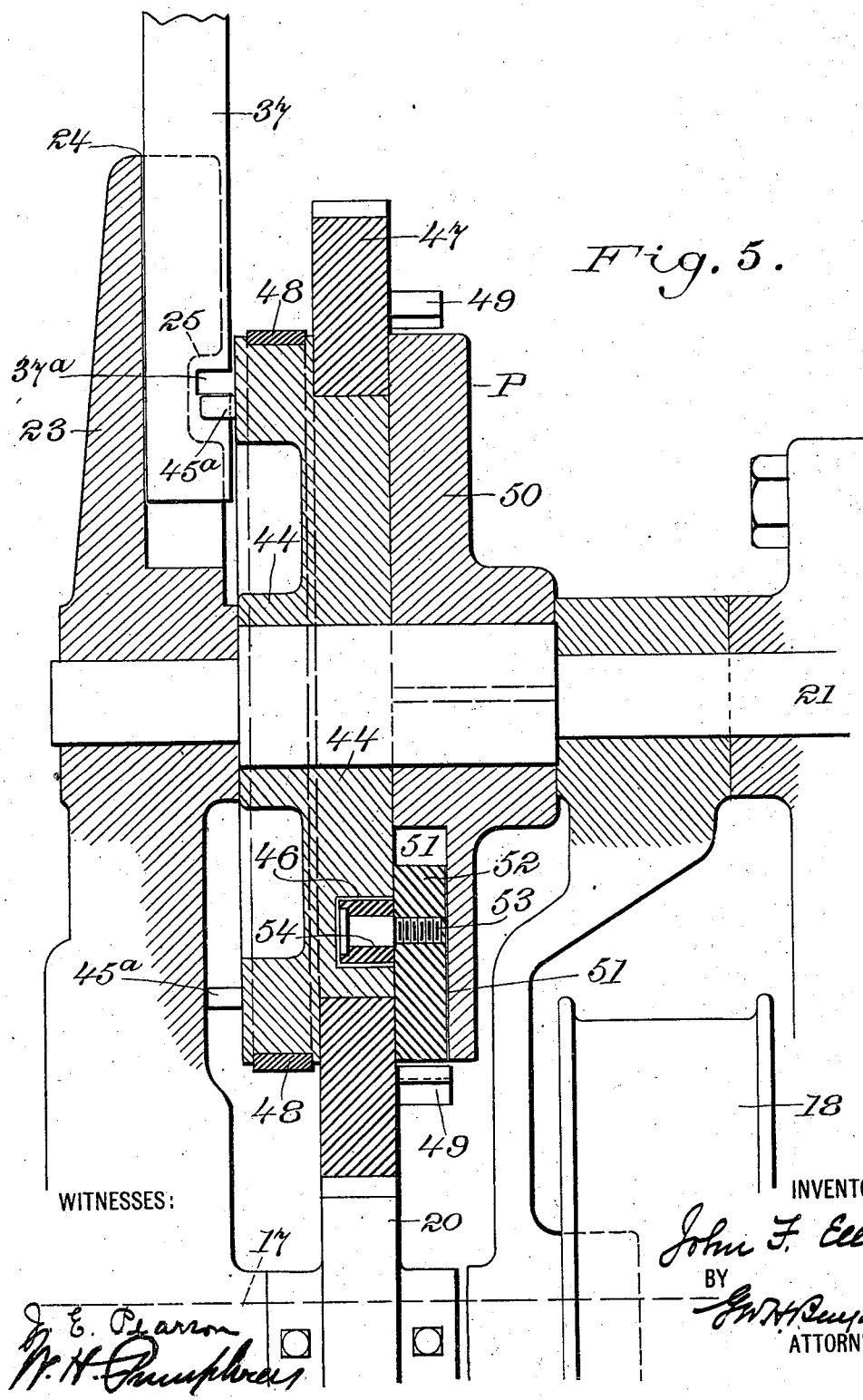

No. 723,995. PATENTED MAR. 31, 1903.
J. F. ELLIS.
APPARATUS FOR REGULATING FLUID PRESSURE FOR THE
APPLICATION OF POWER.
APPLICATION FILED JAN. 30, 1900.
NO MODEL. 13 SHEETS—SHEET 1.
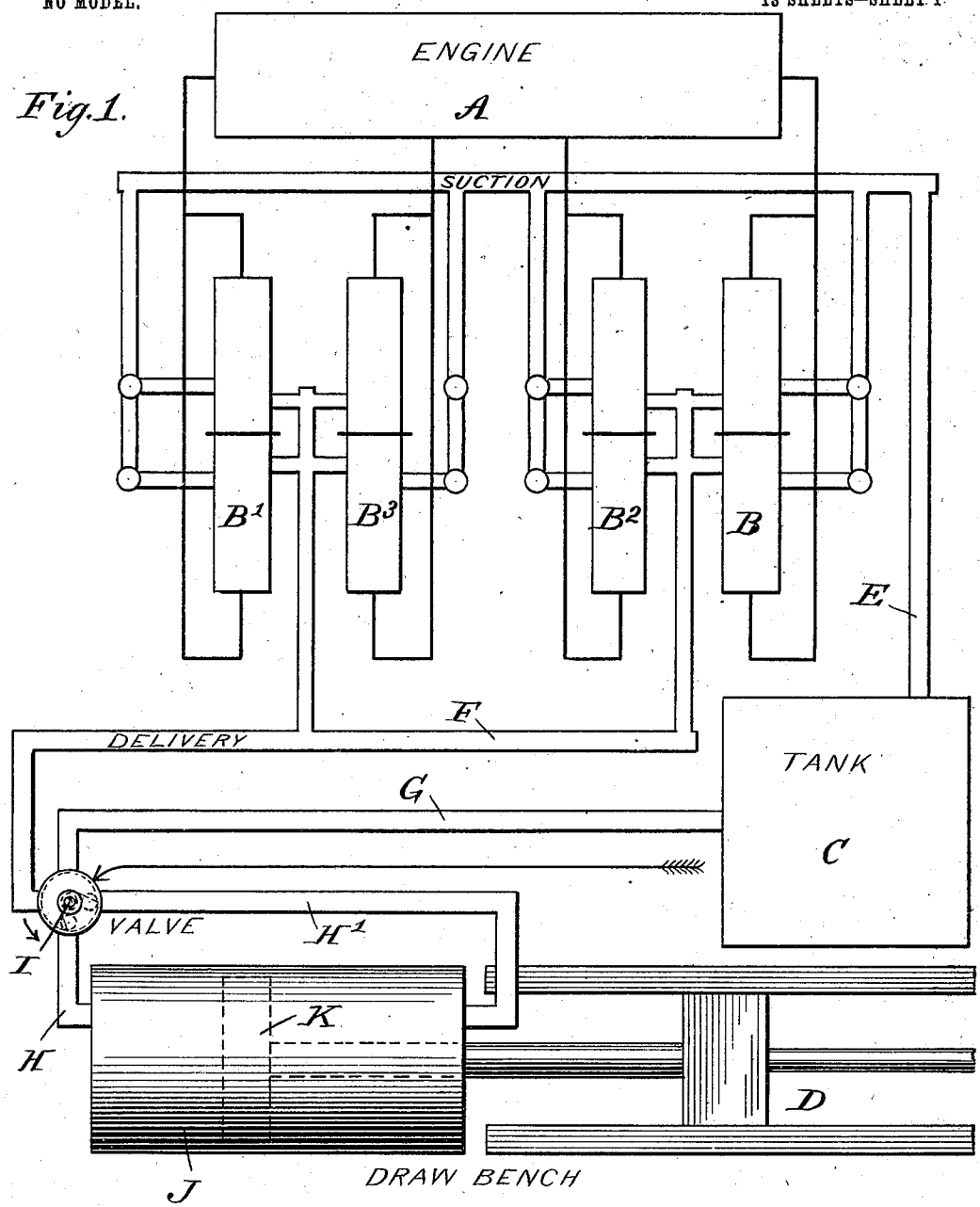
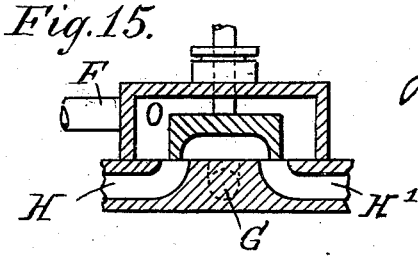
WITNESSES:
J. E. Pearson
C. E. Stecher
INVENTOR
John F. Ellis
BY
ATTORNEY No. 723,995. PATENTED MAR. 31, 1903.
J. F. ELLIS.
APPARATUS FOR REGULATING FLUID PRESSURE FOR THE
APPLICATION OF POWER.
APPLICATION FILED JAN. 30, 1900.
NO MODEL. 13 SHEETS—SHEET 2.
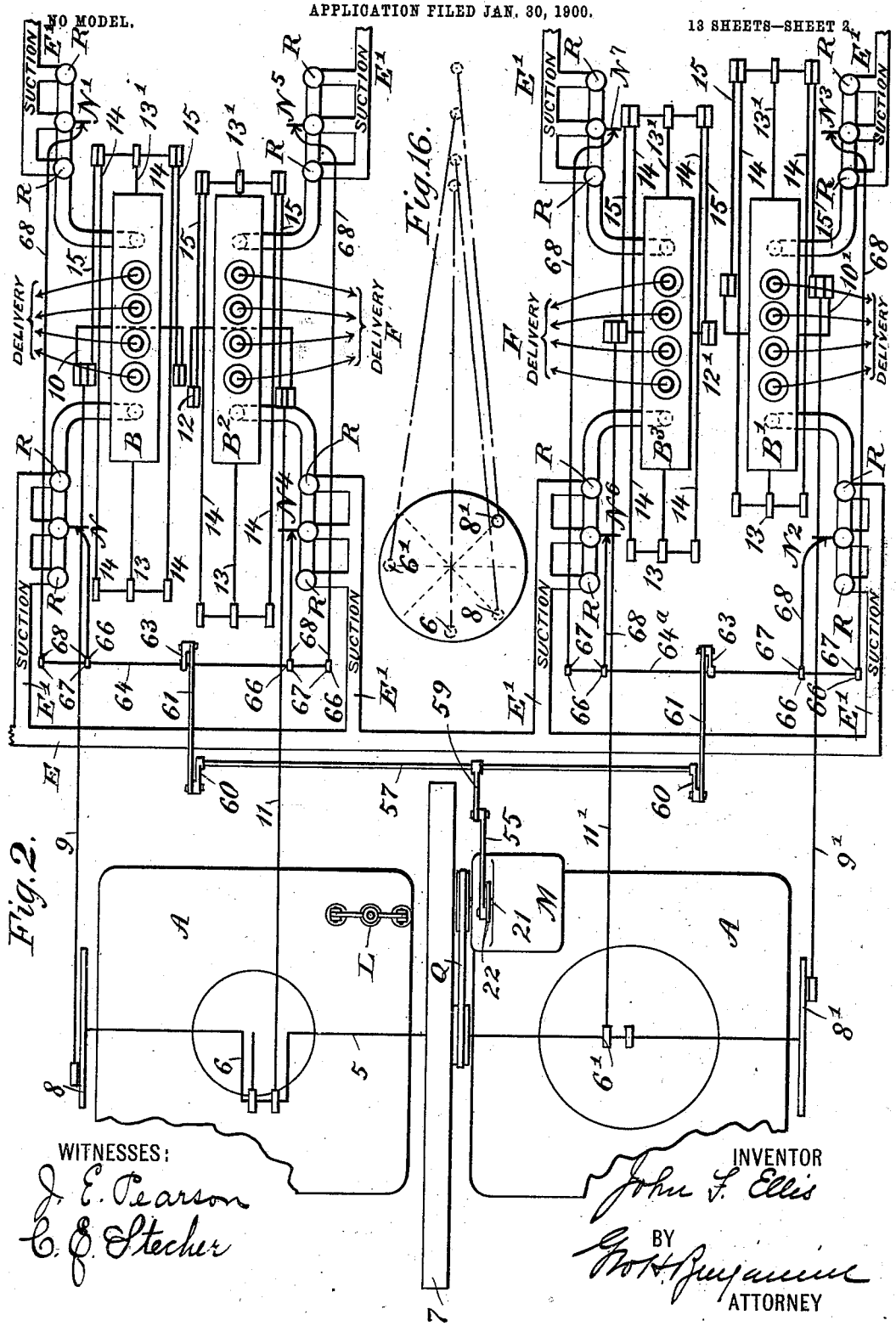

No. 723,995. PATENTED MAR. 31, 1903.
J. F. ELLIS.
APPARATUS FOR REGULATING FLUID PRESSURE FOR THE APPLICATION OF POWER.
APPLICATION FILED JAN. 30, 1900.
NO MODEL. 13 SHEETS—SHEET 3.
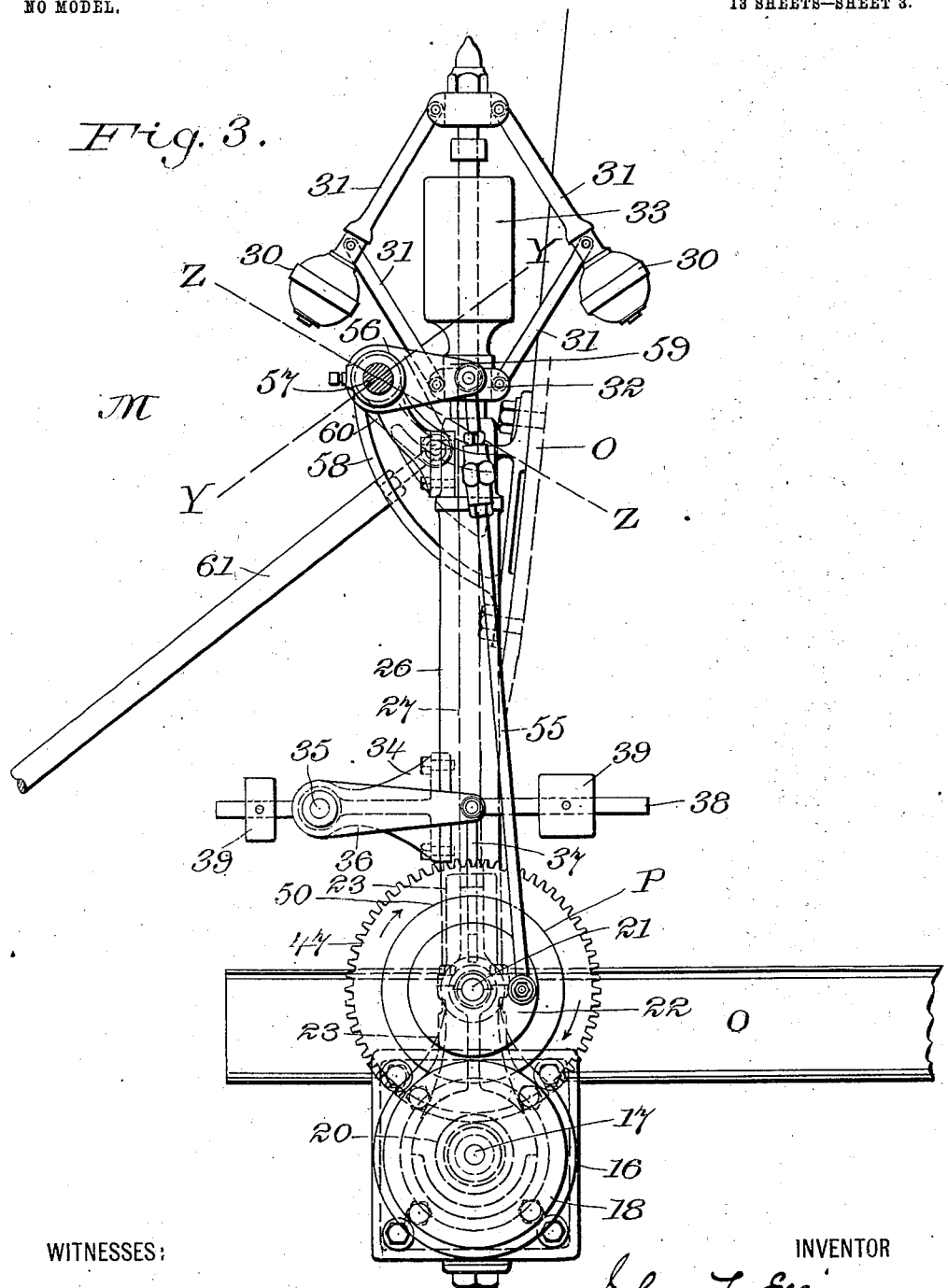

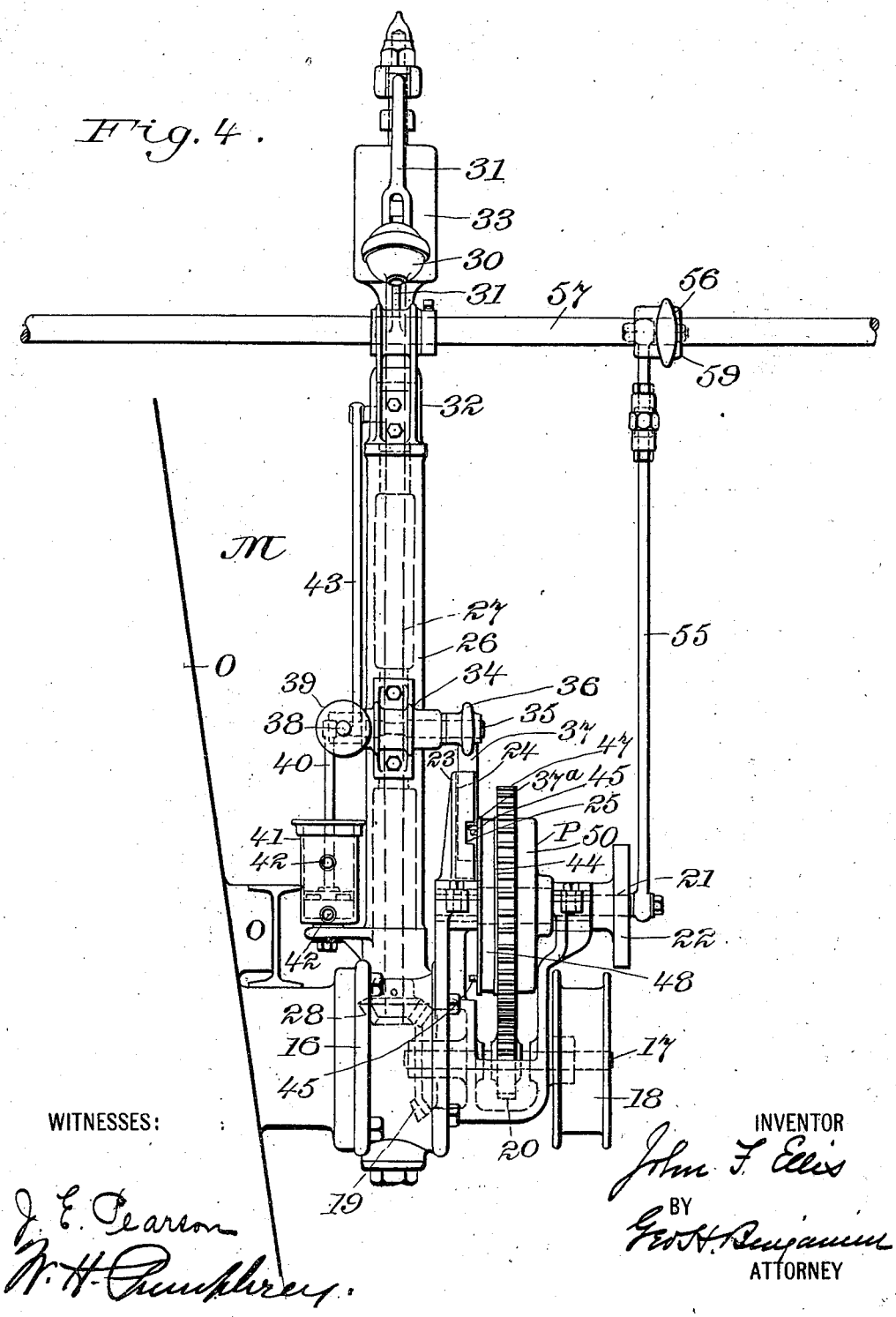

No. 723,995. PATENTED MAR. 31, 1903.
J. F. ELLIS.
APPARATUS FOR REGULATING FLUID PRESSURE FOR THE
APPLICATION OF POWER.
APPLICATION FILED JAN. 30, 1900.
NO MODEL. 13 SHEETS—SHEET 5.

WITNESSES:

INVENTOR
John F. Ellis
BY
ATTORNEY

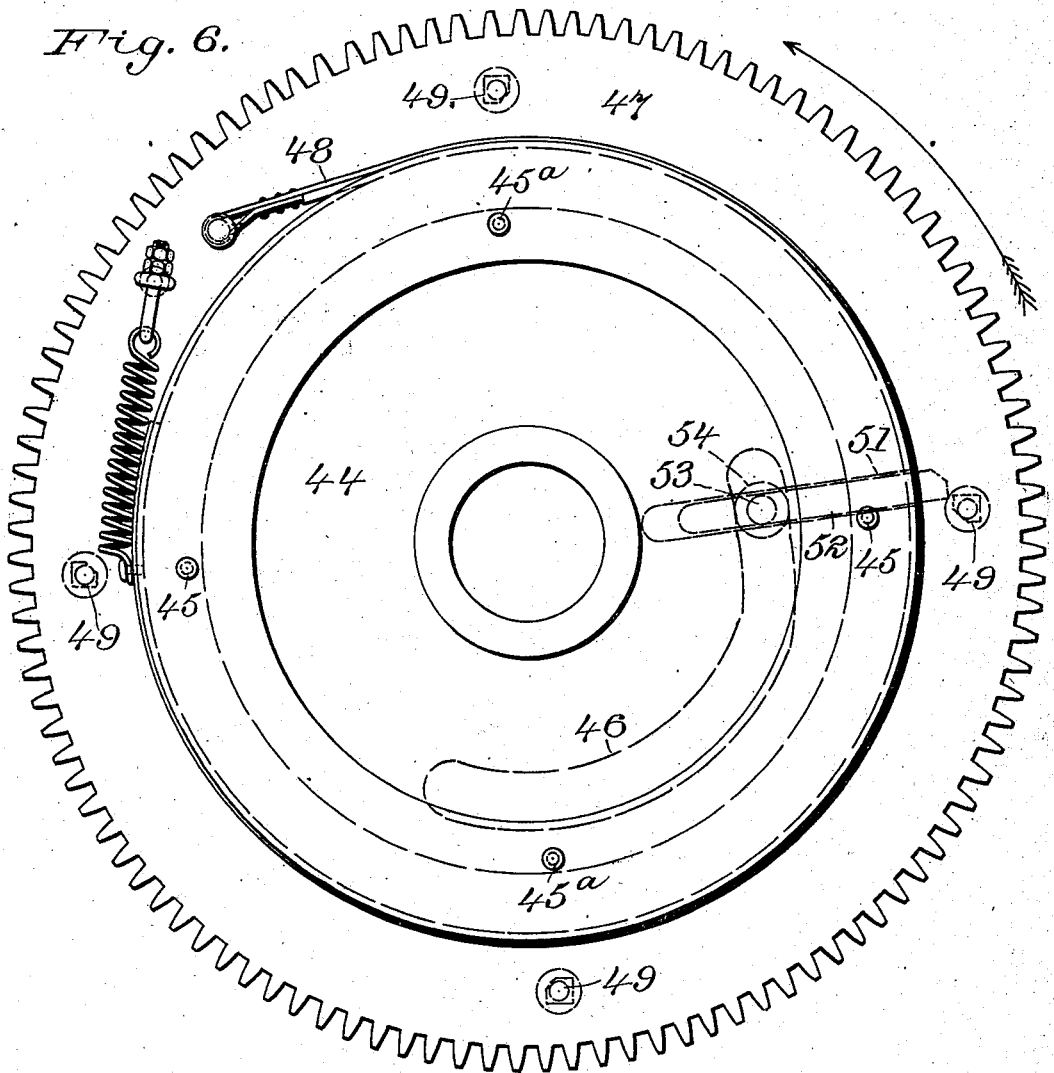

No. 723,995. PATENTED MAR. 31, 1903.
J. F. ELLIS.
APPARATUS FOR REGULATING FLUID PRESSURE FOR THE
APPLICATION OF POWER.
APPLICATION FILED JAN. 30, 1900.
NO MODEL. 13 SHEETS—SHEET 7.

WITNESSES:
J. E. Pearson
W. H. Humphrey

INVENTOR
John F. Ellis
BY
Geo. H. Benjamin
ATTORNEY

No. 723,995. PATENTED MAR. 31, 1903.
J. F. ELLIS.
APPARATUS FOR REGULATING FLUID PRESSURE FOR THE
APPLICATION OF POWER.
APPLICATION FILED JAN. 30, 1900.
NO MODEL. 13 SHEETS—SHEET 10.

WITNESSES:
J. E. Pearson
W. H. Pumphrey

INVENTOR
John F. Ellis
BY
Geo. H. Benjamin
ATTORNEY

THE NORRIS PETERS CO., PHOTO-LITHO., WASHINGTON, D. C.

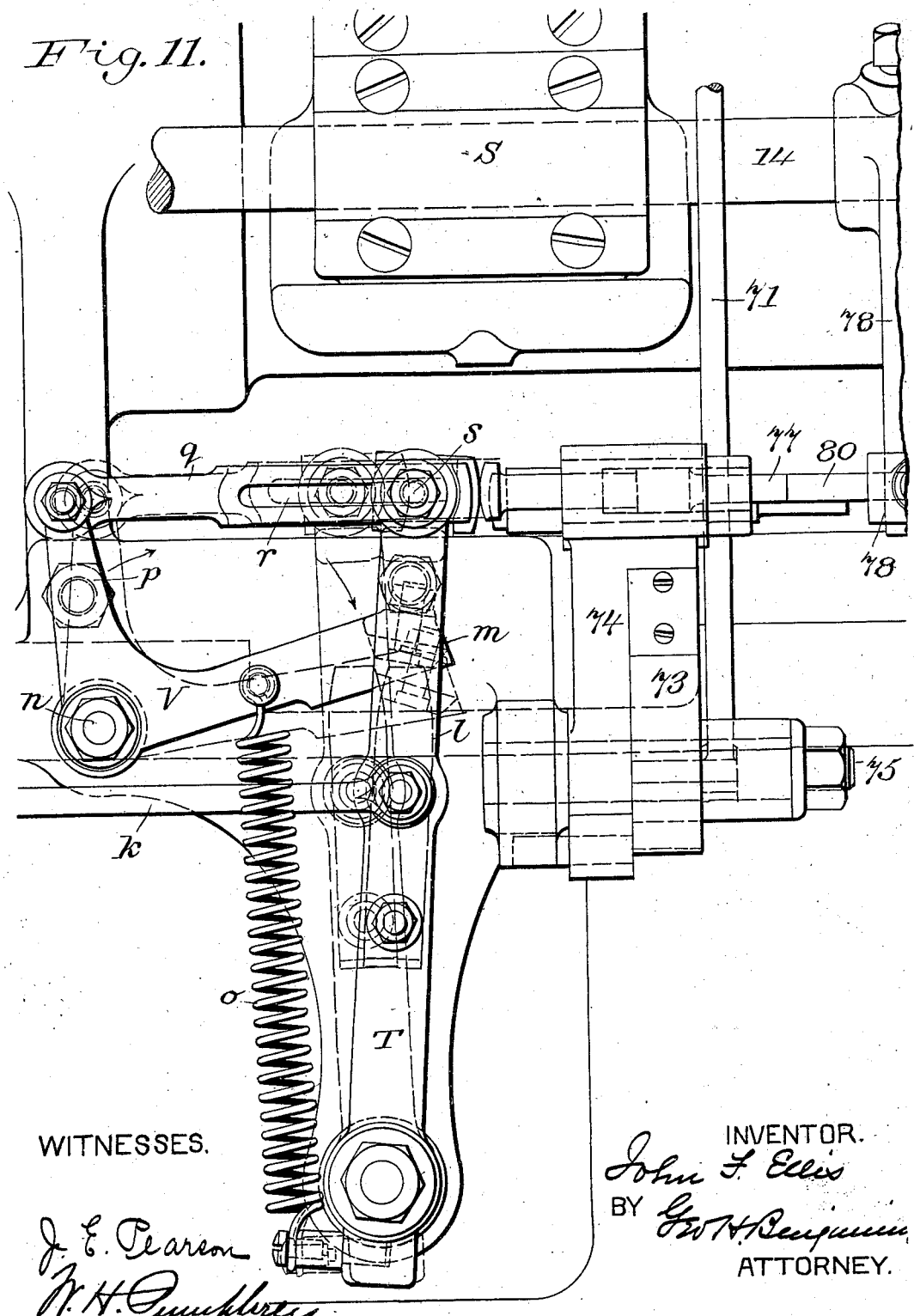

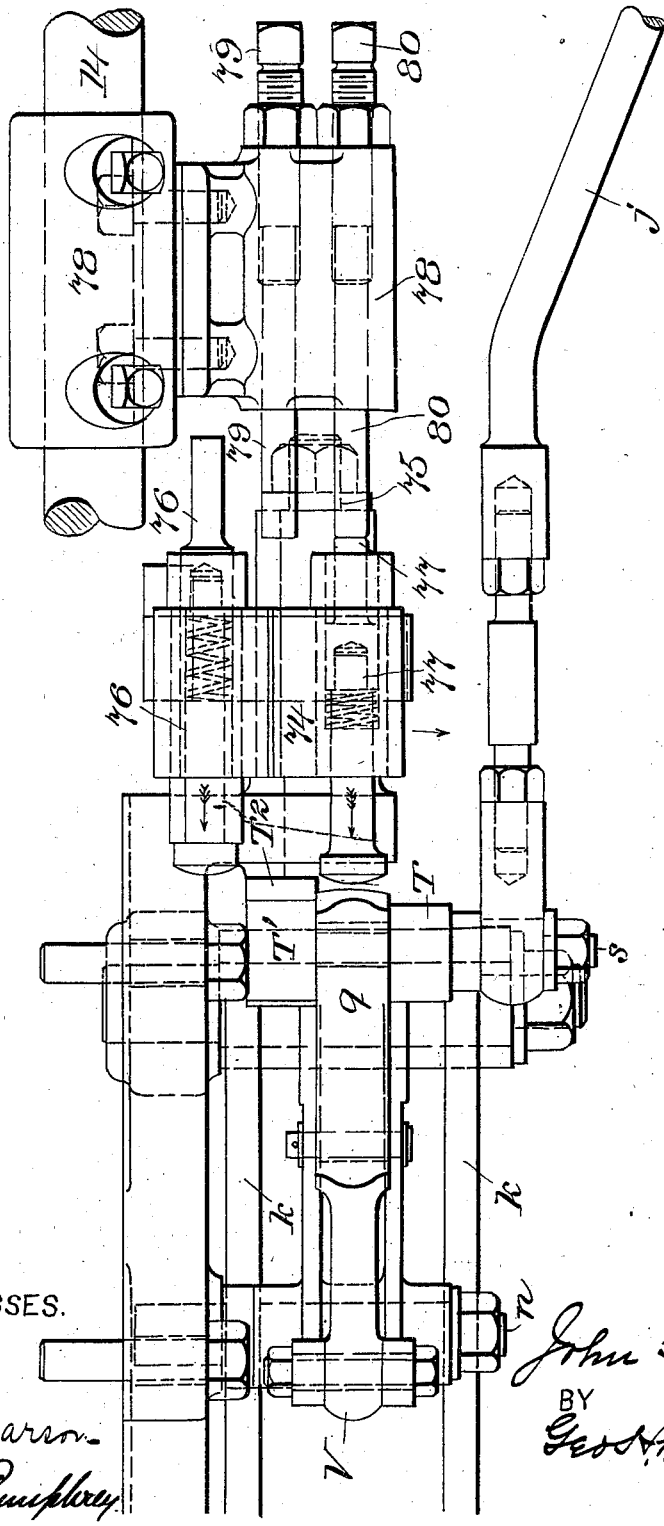

No. 723,995. PATENTED MAR. 31, 1903.
J. F. ELLIS.
APPARATUS FOR REGULATING FLUID PRESSURE FOR THE
APPLICATION OF POWER.
APPLICATION FILED JAN. 30, 1900.
NO MODEL. 13 SHEETS—SHEET 13.

WITNESSES:
J. E. Pearson
C. E. Stecher

INVENTOR
John F. Ellis
BY
Geo. H. Benjamin
ATTORNEY

THE NORRIS PETERS CO., PHOTO-LITHO., WASHINGTON, D. C.

UNITED STATES PATENT OFFICE.

JOHN FRANCIS ELLIS, OF TORRINGTON, CONNECTICUT.

APPARATUS FOR REGULATING FLUID-PRESSURE FOR THE APPLICATION OF POWER.

SPECIFICATION forming part of Letters Patent No. 723,995, dated March 31, 1903.

Application filed January 30, 1900. Serial No. 3,279. (No model.)

*To all whom it may concern:*

Be it known that I, JOHN FRANCIS ELLIS, a citizen of the United States, residing at Torrington, in the county of Litchfield, State of Connecticut, have invented a new and Improved Apparatus for Regulating Fluid-Pressure for the Application of Power, of which the following is a specification.

My invention relates, primarily, to a system of fluid distribution for power purposes whereby the pressure exerted in the circulating system will be in accordance with the work resistance in the circuit and which variation of pressure will be accomplished automatically without appreciably varying the speed of the prime motor and without modifying the economical conditions under which the prime motor of the system is operated.

My invention further relates to the apparatus employed in said system, whereby the pressure exerted in the fluid-circulating system is automatically regulated in accordance with the work in said system.

My invention further relates to the construction of the pump-controller and to the mechanism for operating the by-pass valves.

My invention further relates to various details of construction, all of which will be set forth in the specification and specifically pointed out in the claims.

I will describe my invention in connection with a draw-bench for drawing tubes operated by fluid-pressure; but I wish it understood that I consider my invention as applicable for use with any sort of apparatus operated by fluid-pressure where there is a considerable variation in the pressure made use of at different times.

In drawing tubes by fluid-pressure two methods have heretofore been employed.

First. A pump or pumps are installed which force water into an accumulator at a stated pressure and from which accumulator it is drawn into the cylinder of a draw-bench, where it is used, through the medium of suitable valves, at the pressure required for the work in hand. This method is not economical, owing to the fact that owing to the wide range of work for which a draw-bench is designed the pressure required for the major portion of the time is much less than the maximum pressure in the accumulator, and hence there is a loss which amounts to the difference between the pressure at which the fluid is pumped into the accumular and that at which it is used in the draw-bench.

Second. A pump or pumps are installed which force a fluid directly into a draw-bench cylinder at a constant speed. By this method a greater efficiency in the use of the fluid is obtained over the first method and due to the fact that the pumps have to work against no greater resistance than that required for the work in hand on the draw-bench. This method is also uneconomical by reason of the fact that for a very large portion of the time the resistance against which the pumps act, and consequent load on the motor driving them, is much below that at which the motor operates at its highest economy.

My present invention contemplates the second method in so far as the pumps installed force the fluid directly into the draw-bench at a constant speed, but differs from it in that the pumps are divided into a series of units, and by the employment of a pump-controller acting through by-pass valves situated in the suction of the pumps one or more of the pump units will be automatically effective or non-effective, with the result that the power of the prime motor will be exerted at different times with the same degree of economy through a different number of pump units, and hence exert a pressure in the circulating system directly in accordance with the work in hand on the draw-bench at the time.

The object attained by my invention, therefore, may be said to be, first, the automatic regulating of the pressure in the fluid-circulating system in accordance with the work; second, the economical conversion of the power of the prime motor into fluid-pressure variable in accordance with the work resistance in the circuit through which said fluid is transmitted; third, the manual control of the fluid-pressure at the point where the fluid-pressure is exerted and without altering the automatic regulation of the fluid-pressure in accordance with the work in the fluid-circulating system.

The accompanying diagrams and drawings, in which similar letters and numerals of reference indicate like parts, will serve to illustrate my invention.

Figure 13:
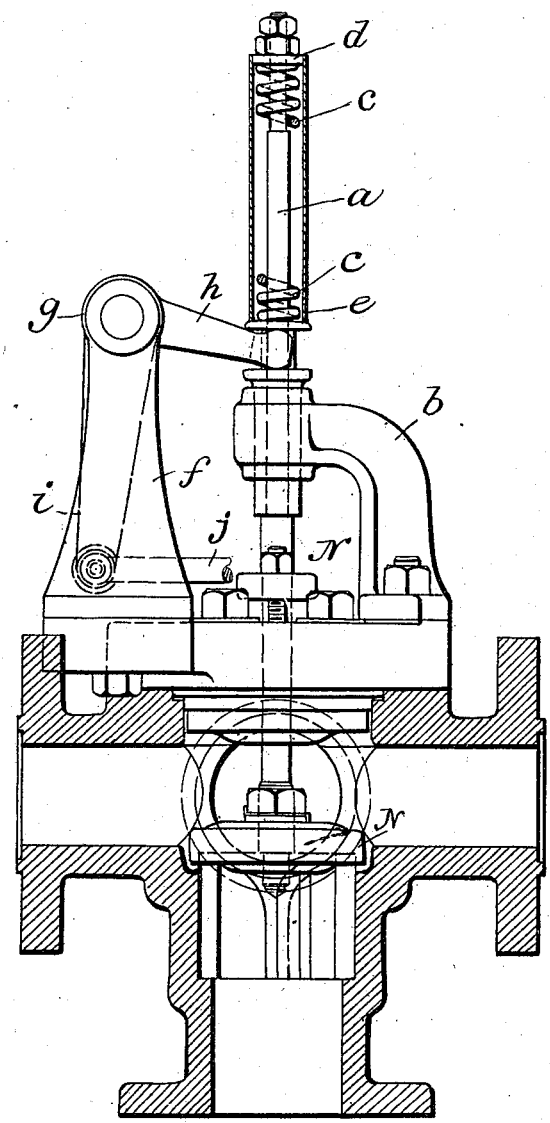
Figure 7:
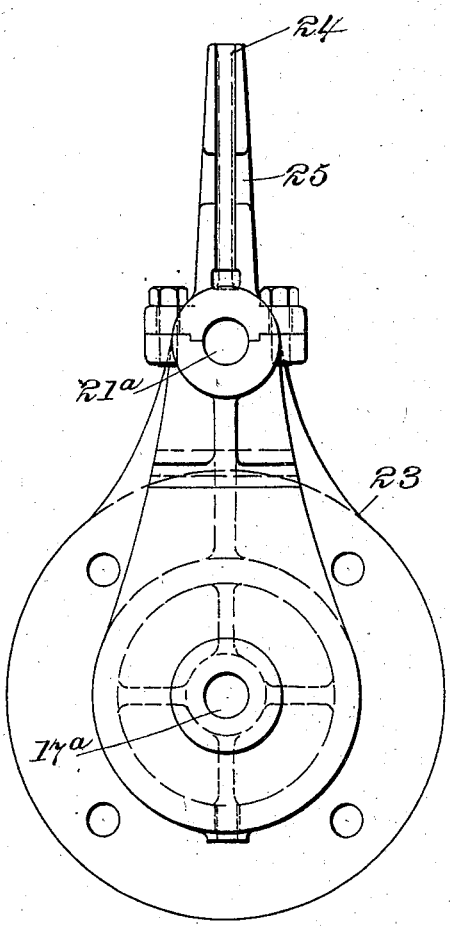
Figure 8:
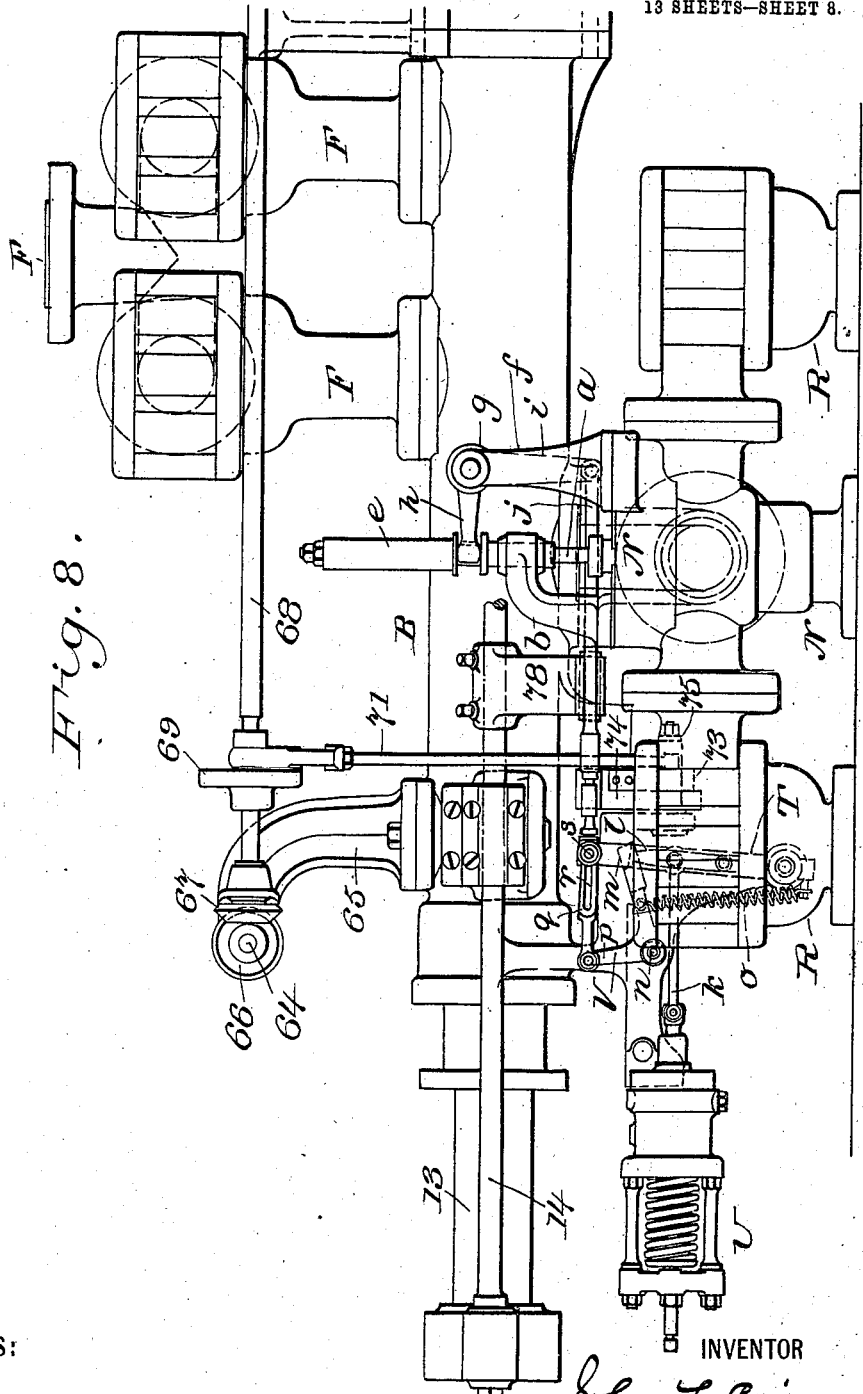
Figure 9:
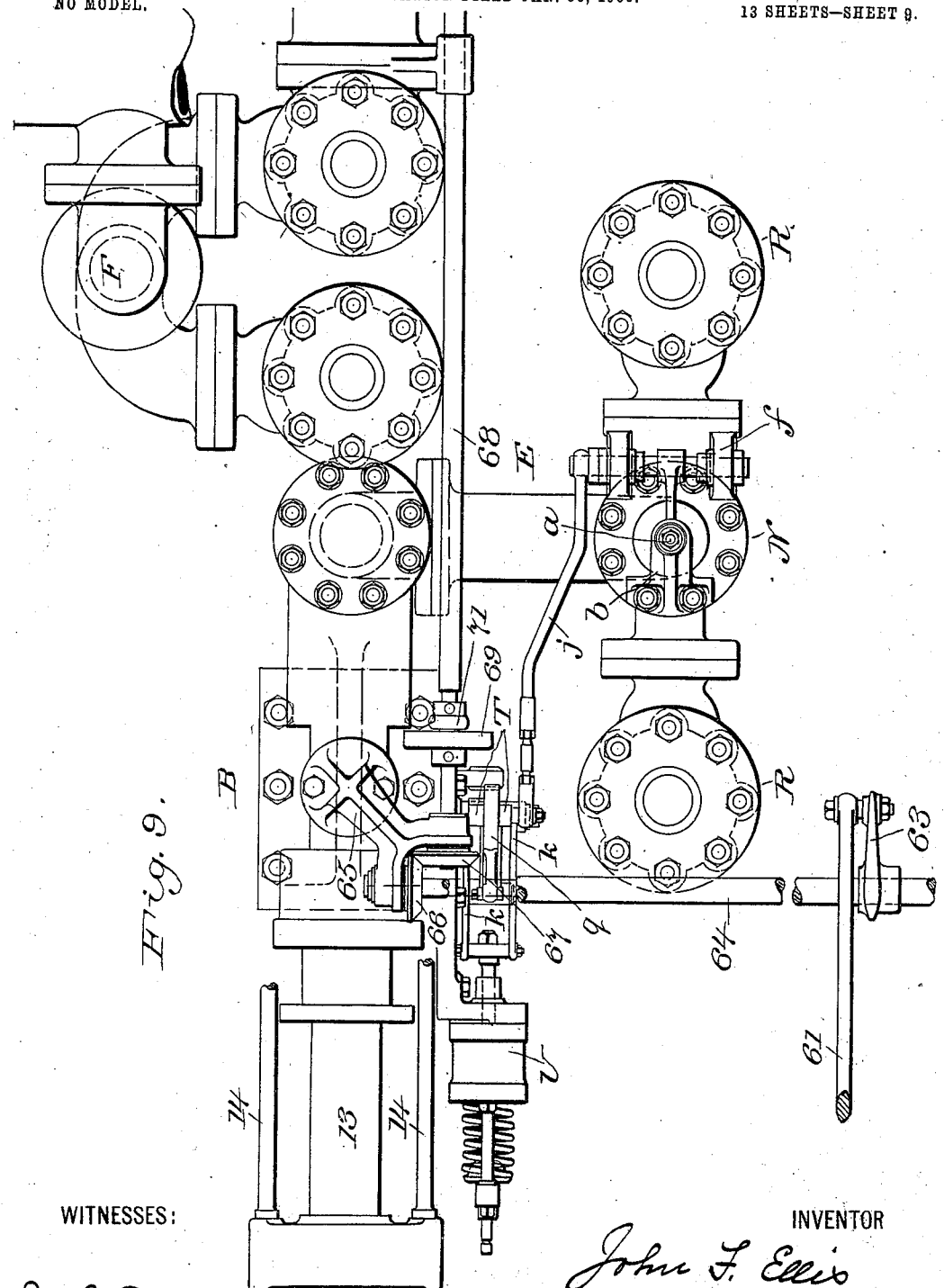
Figure 10:
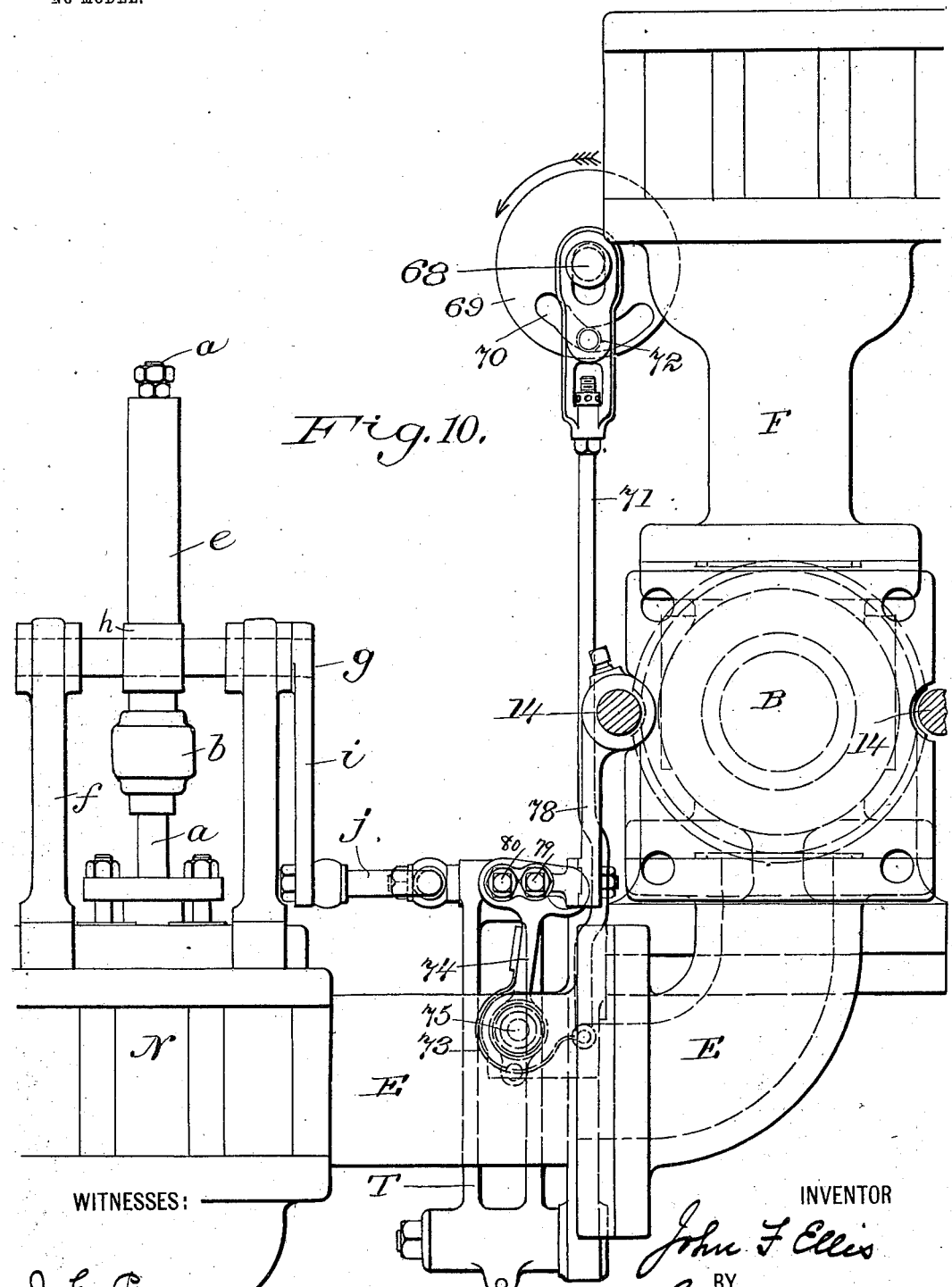
Figure 14:
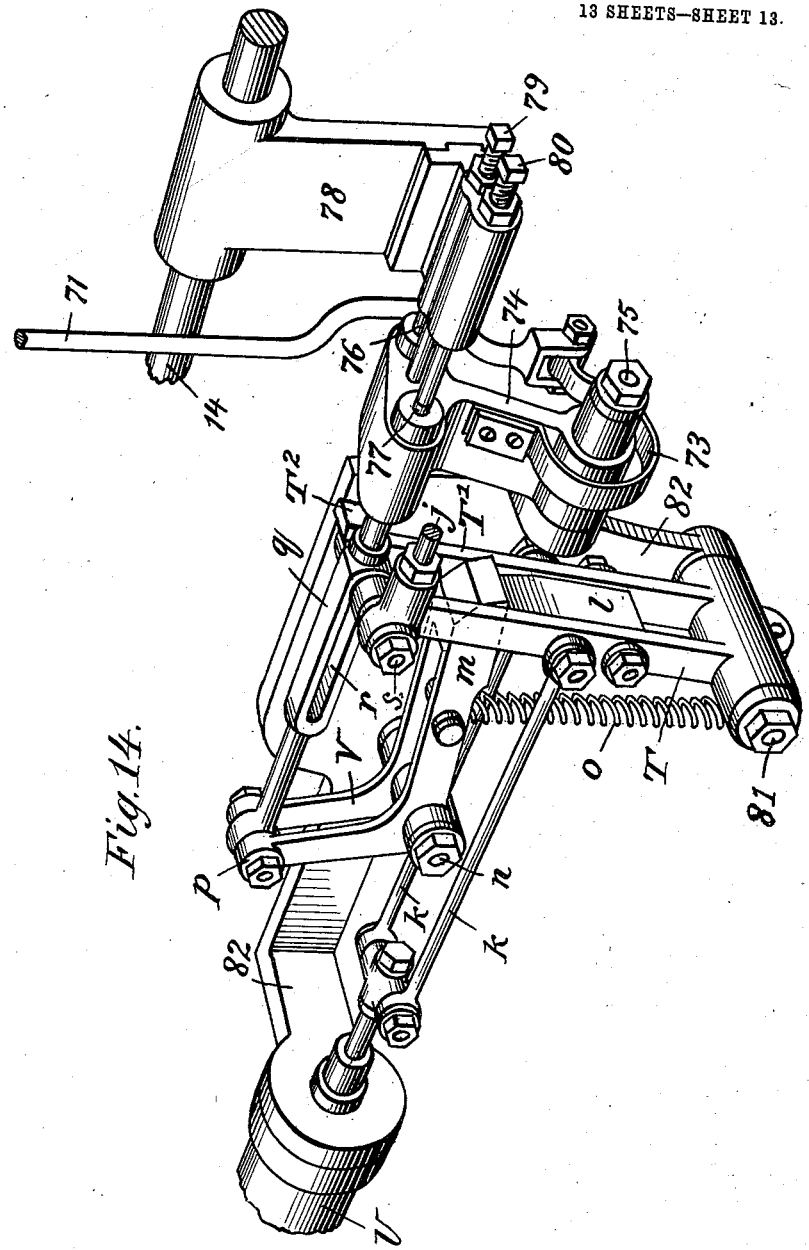

Figure 1 is a diagram illustrating the relation of the prime motor, pump units, draw-bench, and interposed circulating system. Fig. 2 is a diagrammatic plan view illustrating the relation of the prime motor, pump units, and regulating apparatus. Fig. 3 is a side elevation of the pump-controller. Fig. 4 is a front elevation of the pump-controller. Fig. 5 is a vertical section through the motor apparatus of the pump-controller. Fig. 6 is a side elevation taken from the left of the left-hand disk and ring-gear of the motor apparatus of the pump-controller. Fig. 7 is an enlarged side elevation of a portion of the pump-controller shown in Fig. 3. Fig. 8 is a side elevation of one end of a pump and of the by-pass apparatus. Fig. 9 is a plan view of the same parts. Fig. 10 is a front view of the same parts, looking from the right of Fig. 8. Fig. 11 is a side elevation of the details of the locking and releasing mechanism of the by-pass apparatus. Fig. 12 is a plan view of the locking and releasing mechanism of the by-pass apparatus. Fig. 13 is a vertical elevation and partial section of a portion of the by-pass apparatus and valve. Fig. 14 is a perspective view of the locking and releasing mechanism of the by-pass apparatus. Fig. 15 is a vertical section of the controlling-valve employed. Fig. 16 is a diagram illustrating the position of the engine-cranks relative to each other.

The system, considered as a whole, in which my improved apparatus may be employed consists of a steam-engine or other prime motor, a series of pump units, a fluid-circulating system, a pump-controller, a by-pass mechanism in the fluid-circulating system, a device through which the power of the fluid in the circulating system may be applied, and a controlling-valve.

In the following description I will first describe the system and its component parts and then successively the pump-controller, the by-pass mechanism, and the other features of construction.

Referring first to Fig. 1, which illustrates my improved apparatus as used in connection with a draw-bench, A indicates the prime motor, which may be of any suitable type adapted to operate at approximately uniform speed and which will exert the power necessary to do the largest work on the draw-bench with only one pump unit in operation. B B' B² B³ are the pumps. These pumps are coupled in pairs, B B' forming one pump unit, B² B³ the second pump unit. C is a fluid-tank, open at the top; D, draw-bench of any suitable type; E, suction-pipe from tank C to each of the pumps through suitable branch pipes E'; F, delivery-pipe from pumps to draw-bench; G, pipe from draw-bench to tank C; H H', branch pipes communicating with opposite ends of draw-bench cylinder; I, controlling-valve at draw-bench; J, draw-bench cylinder; K, draw-bench piston. The valve I is of the ordinary type—i. e., a horizontal rotating valve with four ports, respectively connected to the pipes F, G, H, and H'. When the valve is in the position shown in the dotted lines, Fig. 1, the fluid finds its way into both ends of the draw-bench cylinder through pipes H H' and also through pipe G to tank, and no pressure is exerted upon the piston K of the draw-bench except that due to the hydrostatic head of the fluid. If the valve, however, is rotated in the direction indicated by the short arrow, the fluid will be directed in front of the piston, conversely if the valve is rotated in the opposite direction to the back of the piston. Any construction of valve may be employed which will direct the fluid to the front or back of the piston. The forward end of the draw-bench, with the usual die, is not shown. The tank C, pipes E, E', F, G, and H constitute the fluid-circulating system.

Referring now to Fig. 2, the prime motor is here shown diagrammatically and is preferably an upright engine of any suitable type provided with a horizontally-disposed shaft 5, having cranks 6 6', disposed under the cylinders at right angles to the shaft, and a fly-wheel 7, mounted on the shaft between the cylinders. At the opposite ends of the shaft are the crank-disks 8 8'. The position of the cranks 6 6', as well as that of the cranks 8 8', relative to each other is shown in the diagram, Fig. 16. The cranks 8 8' are respectively connected, through the rods 9 9', to the rockers 10 10', which operate the pistons of the pumps B B'. The cranks 6 6' are respectively connected, through the rods 11 11', with the rockers 12 12', which operate the pistons of the pumps B² B³. It will be observed that by reason of this arrangement the pumps B B' form one pump unit and the pumps B² B³ a second pump unit. Each of the pumps has two single-acting plungers 13 13', which are connected together by the rods 14 and to the rockers through the rods 15. As each pump is a single-acting double-plunger pump, each pump unit consists of four single-acting pumps, or the two units, considered together, eight single-acting pumps. L represents an engine-regulator of the usual type; M, the pump-controller; N N', by-pass valves of pump B; N² N³, by-pass valves of pump B'; N⁴ N⁵, by-pass valves of pump B²; N⁶ N⁷, by-pass valves of pump B³.

I will first describe the general connection of the engine-governor with the engine and pumps, then the specific construction of the pump-controller and its operation.

The dimensions of the prime motor A should be such that with steam at the normal pressure the horse-power exerted will be sufficient to drive economically both of the pump units—i. e., B B', B² B³—at one-half the maximum pressure which may be exerted in the fluid-circulating system, or one of the pump units, either B B' or B² B³, at the maximum pressure.

It will be understood that if the work resistance in the fluid-circulating system is in excess of the fluid-pressure exerted with both pump units at work the engine will be loaded beyond its economical capacity and that if the overload is continued over a sufficient period of time the fly-wheel 7 of the engine will lose its momentum and the speed of the engine will be reduced. When such reduction of speed takes place, the pump-governor M, which is belted to the engine-shaft 5, will be correspondingly actuated, and its movement, transmitted through appropriate mechanism, will open the by-pass valves in the suction-pipes of either the pump unit B B' or B² B³, whereby the fluid which would normally be drawn into the cylinder of the pump unit whose by-pass valves are open will flow back into the suction-pipes instead of being forced into the delivery-pipes of the circulating system. When this condition is attained, the whole power of the engine exerted through one pump unit will be sufficient to exert the pressure required in the draw-bench or apparatus through which the fluid-pressure is applied to do the greatest work for which the draw-bench or other apparatus is designed.

If the work in hand on the draw-bench or other apparatus is such that the pressure required makes use of all the power that can be economically exerted by the engine when working in connection with one of the pump units, the by-pass valves of the non-operative pump unit will remain open until the work resistance in the circulating-circuit has ceased or been reduced—as, for instance, where a tube has been drawn or forced through the die of the draw-bench and the only power required is that necessary to move the unloaded piston of the draw-bench.

As soon as the work resistance is reduced in the circulating system, so that the work required of the steam-engine is less than its economical capacity with only one pump unit at work, then the speed of the engine will be slightly increased, which increase secondarily acts upon the pump-governor, which in turn, through the interposed mechanism, acts to close the open by-pass valves of the non-effective pump unit, when the first condition, with both pump units at work, is resumed.

Referring now to Figs. 3, 4, 5, 6, and 7, the construction of such a pump-controller as I may employ is illustrated. The connection of the pump-controller to the by-pass apparatus is diagrammatically illustrated in Fig. 2.

So far as relates to the employment of a pump-controller with the other apparatus shown I wish it understood that I may use the device shown or any other automatically-acting device, mechanical or electrical, primarily actuated by variations of the work resistance in a fluid-circulating system and which will correspondingly vary the work resistance to the prime motor.

The pump-controller M is mounted upon a bracket 16, carried by the engine-frame O. The exact location of the pump-controller is not material, so long as motion can be imparted to it from the main shaft of the engine 5, as will hereinafter be described. Mounted upon suitable bearings in the bracket is the horizontal shaft 17, which carries on its outer end the belt-pulley 18, on its inner end the beveled gear 19, and at about its center the small gear 20. Mounted also in suitable bearings in the bracket and above the shaft 17 is the shaft 21, having located at its outer end the disk-crank 22 and near its inner end the motor mechanism P of the pump-controller. The details of the motor mechanism are shown in Fig. 5. To the left of the motor mechanism and forming a part of the bracket 16 is a vertical casting 23, the details of which are shown in Fig. 7. The inner bearings of the shafts 17 and 21 are shown, respectively, at 17ª and 21ª of Fig. 7. The upper portion of the casting 23 has the vertical slot 24 and the transverse slot 25, the purpose of which will hereinafter be described. Mounted also upon the bracket 16 is the column 26, within which is located the vertical shaft 27, on the lower end of which is the beveled gear 28, which meshes with the beveled gear 19 on the shaft 17. Mounted on the upper end of the shaft 27 are a pair of pivoted balls 30, which are connected, through the links 31, with a sleeve 32, which is capable of vertical movement upon the shaft 27. 33 is a counterbalance-weight. The parts 30, 31, 32, and 33 are quite similar in construction to the ordinary ball-governors used in steam-engine practice. Mounted upon the column 26 is a bracket 34, in which is pivoted a shaft 35. Secured to one end of this shaft is a lever 36, and carried by the other end of this lever is a bolt 37. This bolt is adapted to have a vertical movement in the slot 24 of the casting 23, Fig. 7. Mounted upon the other end of the shaft 35 on the opposite side of the column 26 is a longer lever 38, upon which are the counterbalance-weights 39. Attached at or about the middle of the lever 38 is the piston 40 of the dash-pot 41. This dash-pot may be of any suitable construction; but I prefer to employ with it a circulating system such as is commonly used with a dash-pot. The points of connection of this system are shown at 42. Connected, respectively, to the sleeve 32 at one end and to the lever 38 on the other end is the rod 43. (See Fig. 4.) The point of attachment of this rod to the lever 38 corresponds to that of the piston 40 of the dash-pot 41 and also to that of the bolt 37 on the lever 36. Consequently when the sleeve 32 is moved either up or down a corresponding motion is imparted to the piston of the dash-pot and the bolt.

Referring now to Figs. 5 and 6, which show the construction of what I have termed the "motor" apparatus of the pump-controller, mounted on the inner shaft 21, but not fastened thereto, is a disk 44. Projecting from the left-hand face of this disk and arranged equidistant (ninety degrees) are the pins 45 45ª. The pins 45 are arranged directly opposite, as also the pins 45ª. The pins 45 are, however, nearer the periphery of the disk than the pins 45ª. The reason for this will hereinafter be explained. Formed in the right-hand face of this disk is a cam-slot 46.

Referring to Fig. 7, the casting 23 is provided with a transverse slot 25. The vertical diameter of this slot is sufficient to permit the passage, upon rotation of the disk 44, of the pins 45 45ª. In the same casting is the vertical slot 24, and in this slot, as has been previously explained, is located the bolt 37. The lower end of this bolt is provided with a transverse slot 37ª. It will now be understood that if the slot 37ª in the bolt 37 is in the path of movement of the pins 45 these pins may pass through the slot; but as the pins 45ª do not follow the path of movement of the pins 45, but a parallel path, these pins cannot pass through the slot 37ª, but will strike upon the sides of the bolt. If, however, the position of the bolt be changed—that is, lowered—then the pins 45ª will pass through the slot; but the pins 45 will strike against the sides of the bolt. The purpose of this arrangement will hereinafter be described. The disk 44 has two diameters, upon the smaller of which is mounted the ring-gear 47. This gear meshes with and receives motion from the small gear 20 on the shaft 17. Connected to the ring-gear 47 and surrounding the greater periphery of the disk 44 is a spring friction-band 48. The tension of this band 48 is sufficient to transmit the motion of the ring-gear 47 to the disk 44 when the disk is free to move—that is, when the bolt 37 permits movement. Ordinarily the disk 44 is not in motion. Consequently the tension-band 48 revolves with the disk 47 and over the greater periphery of the disk 44. Projecting from the right-hand face of the ring-gear 47 are the four pins 49, arranged equidistant (ninety degrees) from each other. Mounted upon the shaft 21 and keyed thereto is a disk 50. The left-hand face of this disk has formed in it a radial slot 51, in which is located a sliding bolt 52, which carries a pin 53, on which is a roller 54. The roller 54 is situated in the cam-slot 46 of the disk 44. The cam-slot 46, it will be observed, follows in direction the curve of the ring-gear 47 for the greater portion of its length and then turns abruptly inward.

If the position of the parts is as shown in Fig. 6—that is, with the cam-roller 54 in that portion of the cam-slot at the greatest distance from the periphery of the ring-gear—then when the ring-gear is rotated in the direction of the arrow the sliding bolt 52 will be moved radially outward and for a sufficient distance to cause it to be brought in contact with the right-hand face of the next pin 49—i. e., the pin situated at ninety degrees to the left from the position of the sliding bolt, the purpose of which will be hereinafter described. Mounted on the end of the shaft 21 is the crank-disk 22, and connected to it is the rod 55, which is attached at its upper end to the bell-crank 56. The bell-crank 56 consists of a horizontally-disposed shaft 57, which is carried in the brackets 58, suitably secured to the engine-frame O. The bell-crank 56 is provided with three crank-arms, one of which, 59, is located at about the center of the shaft 57 and is connected to the rod 55. The other two crank-arms 60 are located at opposite ends of the shaft 57 and are connected to the rods 61. (See Fig. 2.)

I will now describe the mechanical operation of the pump-controller considered alone and apart from its influence upon the by-pass valves which control the fluid-pressure, leaving that portion of the description until after the mechanism of the by-pass valves has been specifically set forth.

We will assume that the engine is rotating at its normal speed and that both pump units B B', B² B³ are effective, also that the various parts of the motor apparatus of the pump-controller are in the position shown in Figs. 5 and 6. The direction of the rotation of the shaft 5 is such that its motion, transmitted through the belt Q, will rotate the pulley 18, shaft 17, and ring-gear 47 in the direction indicated by the arrow. The rotation of the ring-gear 47 carries with it the tension-band 48, which slides over the periphery of the disk 44, the disk 44 not being in motion, as one of the pins 45ª is in contact with the vertically-acting bolt 37. (See Fig. 5.) This condition will be maintained so long as the speed of the engine is constant. When the speed of the engine falls below that which is normal by reason, for instance, of increase of work resistance in the fluid-circuit, with both pump units effective, the balls of the governer fall and carry down the sliding sleeve 32, which motion is transmitted through the vertical rod 43 to the levers 36 and 38 and thence to the piston 40 of the dash-pot and vertically-acting bolt 37. Quick motion downward is resisted by the dash-pot. When the bolt 37 has moved downward, so that the slot 37ª is directly in the path of the pins 45ª, the disk 44 will rotate in unison with the ring-gear 47 by virtue of the force exerted by the tension-band 48. This rotation will continue until the next succeeding pin in order, 45, which does not traverse the same circumferential path as the pins 45ª, has moved through an arc of ninety degrees and has come in contact with the body of the bolt 37, which brings the disk 44 to rest. During the rotation of the disk 44 the cam-slot 46 on the opposite face of the disk 44 has moved over the cam-roller 54, the disk 50 at this moment being stationary, and the cam-slot in its movement over the roller has caused the sliding bolt 52 to be moved outward (to the right) until the end of the bolt is in the path of one of the pins 49 on the right-hand face of the ring-gear 47, which, it will be remembered, is in motion. When contact occurs between one of the pins 49 and the sliding bolt 52, the disk 50 is rotated in the direction of motion of the ring-gear 47, (shown by arrows, Figs. 3 and 6,) and as the disk 50 is keyed to the shaft 21 similar motion is communicated to the crank-disk 22 and transmitted through the rod 55 to the bell-crank 56, (the axis of which then assumes the position indicated by the dotted lines Z Z, Fig. 3,) center crank-arm 59, shaft 57, end crank-arms 60 to mechanism connecting by-pass apparatus. This movement of the bell-crank transmitted to the by-pass mechanism, to be hereinafter described, results in pump unit B B' or $B^2 B^3$ being thrown out of action.

It will be understood that the motion imparted to disk 22, and consequently to the bell-crank and other connected parts, is limited to an arc of ninety degrees, owing to the fact that before the disk 22 has traversed its arc of ninety degrees the disk 44 has traversed its and has come to rest, owing to one of the pins 45 being brought into contact with the vertical bolt 37. At the time when the disk 44 is brought to rest the cam-roller 54 is at the opposite end of the cam-slot from that shown in Fig. 6. Consequently as the disk 44 is brought to rest with disk 50 still rotating the cam-slot 46 moves over the cam-roller 54 in a direction opposite to that which it previously moved, thereby retracting the sliding bolt 52 out of the path of the pins 49 on the disk 47, which permits the disk 50 and shaft 21 to come to rest.

When the work resistance in the fluid-circuit becomes such that with the pump unit $B^2 B^3$ only in action the work resistance does not constitute an economical load for the engine, then the balls of the governor rise and carry up the sliding sleeve 32, which motion is transmitted through the vertical rod 43 to the levers 36 and 38, (quick motion upward being permitted by the free admission of oil under the piston of the dash-pot,) and as the levers ascend the piston of the dash-pot 41 and the vertical bolt 37 move upward. When the bolt 37 has moved upward, so that the slot $37^a$ is directly in the path of the pins 45, the disk 44 commences to rotate, and thereby brings the next pin $45^a$ in contact with the bolt 37, which stops the disk in the manner before described. When this condition is attained, the crank-disk 22 has made by two successive movements two steps forward—that is, has moved from the position shown in Fig. 3 first ninety degrees downward then ninety degrees upward to the left—so that the location of the point of connection of the rod 55 to the disk 22 is exactly opposite to that shown in Fig. 3. It will be observed, however, that at this moment the position of the bell-crank is exactly the same as that shown in Fig. 3, and it follows that all of the parts connected and controlled by the bell-crank are also in the same position which they occupied when the point of connection of the rod 55 to the disk 22 was in the position shown in Fig. 3—that is to say, both pump units will be again effective. Should the engine again fall below its normal speed, the action of the pump-governor first described is repeated. The disk 22 is again moved through an arc of ninety degrees upward, which moves the axis of bell-crank to the position shown in dotted lines Y Y, Fig. 3, and throws pump unit $B^2 B^3$ out of action.

From the foregoing it will be seen that the first motion of the crank-disk 22 through an arc of ninety degrees acts to throw pump unit B B' out of operation; that the second movement through an arc of ninety degrees acts to throw pump unit B B' back into operation; that the third motion through an arc of ninety degrees serves to throw pump unit $B^2 B^3$ out of operation; that the fourth motion through an arc of ninety degrees serves to throw the pump unit $B^2 B^3$ back into operation. It will thus be seen that so far as the motor apparatus of the pump-controller is concerned it is designed to make a step-by-step movement forward, each step being ninety degrees, and the motor apparatus energized, so far as the successive steps are concerned, by changes of work resistance in the fluid-circuit—that is, in the order given: first, by an increase of resistance; second, by a decrease of resistance; third, by an increase of resistance; fourth, by a decrease of resistance. Further, it will be observed that owing to the relation existing between the pump-controller and the by-pass apparatus, to be hereinafter described, the pump unit thrown out of operation by reason of the increase of resistance in the work-circuit is not always the same pump unit, but alternately—first, for instance, the pump unit B B' and subsequently the pump unit $B^2 B^3$.

I do not wish to limit myself to the specific mechanism described for effecting the step-by-step motion forward, by reason of which pump units may be alternately rendered effective or non-effective, as various other apparatus may be used to produce the same result and which will be within the spirit of my invention.

Referring now to Figs. 2, 8, 9, 10, 11, 12, and 13, I will describe the by-pass apparatus.

In the diagram Fig. 2 four pairs of single-acting pumps B B', $B^2 B^3$ are shown arranged parallel and in two groups, the four single-acting pumps B $B^2$ forming the group to the left of the figure and the four single-acting pumps $B^3$ B' the group to the right of the figure. Each of these eight pumps has an independent suction-pipe, (marked "Suction" on the diagram,) and located in each of these suction-pipes are three valves, placed in line. The outer pair are designated by the letter R and the inner by-pass valve by the letter N, N' for pump B, $N^2 N^3$ for pump B', $N^4 N^5$ for pump $B^2$, $N^6 N^7$ for pump $B^3$. The valves marked R are ordinary self-closing pump-valves. The valves marked N to N⁷, inclusive, are special forms of by-pass valves, the details of which are shown in Fig. 13. In this figure the valve N consists of an ordinary disk valve provided with an elongated stem $a$, which is guided by the bracket $b$. Surrounding the upper end of the stem is a spring $c$, which bears at its upper end upon a plate $d$, connected to the end of the stem, and at its lower end upon the inner side of the bottom of the cylindrical casing $e$. The tension of the spring $c$ is sufficient under ordinary circumstances to overcome the weight of the valve N, but should the valve stick or be resisted in its upper movement by any obstacle, then the spring $c$ will give and allow the cylindrical casing to be moved bodily upward without moving the valve N N⁷. Arranged opposite to the bracket $b$ is a standard $f$, upon which is pivoted a bell-crank $g$. One lever $h$ of the bell-crank has a bifurcated end $h$ and surrounds the stem $a$ of the valve, and is situated under the cylindrical casing $e$ which surrounds the stem. The other lever $i$ of the bell-crank $g$ extends downward and is connected to the rod $j$.

I will now describe the connection of the by-pass mechanism to the pump-controller. In the ordinary operation of each single-acting pump the fluid is drawn by the action of the pump from the tank C, through the suction-pipe E, and a valve R (the by-pass valves N to N⁷ at such time being closed) and delivered into the circulating system through a delivery-pipe F. When a by-pass valve of a pump unit is opened, the pull of the pump-piston will not ordinarily be sufficient to open a valve R; but should such a valve R be opened by hydrostatic pressure from below any fluid which passes such valve R will be forced back by the action of the pump through such open by-pass valve N to N⁷ and be returned to the tank C. Connected to the cranks 60 on the ends of the shaft 57 are the rods 61, Figs. 2 and 9. These rods are connected through the cranks 63, which correspond in position, with the shafts 64 64ᵃ. The shafts 64 64ᵃ are mounted in brackets 65 on the top of the pump-cylinders shown in Figs. 8 and 9, and on opposite ends of the shafts 64 and 64ᵃ are the beveled gears 66. These beveled gears take into similar beveled gears 67 on the end of the shafts 68. The shafts 64 64ᵃ are located at one end of the pumps—i. e., the end nearest the engine and at right angles to the axis of the pumps—whereas the shafts 68 are parallel to the axis of the pumps.

It will be understood by reference to Fig. 2 that the shafts 68 extend to the by-pass apparatus at both ends of each pump. Figs. 8 and 9 show merely the by-pass apparatus at one end of a pump. Therefore all parts shown at one end of a pump must be understood to be duplicated at the other end of the pump—i. e., eight pumps, eight by-pass apparatus.

It will be understood by reference to Fig. 2 that the controlling apparatus for the by-pass valves of a pump unit are arranged to be acted upon simultaneously and uniformly. Consequently the description which applies to the controlling apparatus of pump B likewise applies to the controlling apparatus of B′, and the same is true so far as regards identity of position and operation of the controlling apparatus of pump B² and the controlling apparatus of pump B³.

In the foregoing description I have described two pump units, each composed of four single-acting pumps and four by-pass apparatus. Manifestly I may reduce the size of a pump unit to, for instance, one pump and one by-pass apparatus, or I may increase the size of a unit to, for instance, eight pumps and eight by-pass apparatus, or I may increase the number of pump units to, for instance, three units with four single-acting pumps in each unit without in any wise altering the general method of operation described in this specification.

It will be understood from the foregoing description that for each movement of the pump-controller through ninety degrees a corresponding movement will be imparted to the parallel shafts 68 through the crank-disk 22, rod 55, crank-arm 59, crank-arm 60, rod 61, crank 63, shafts 64 64ᵃ.

Mounted on the ends of the shafts 68 are the cam-disks 69, through the medium of which the by-pass valves N to N⁷ are actuated. The drawing Fig. 8, which represents but one-half of a pump, shows only one of such disks. These disks have formed upon their opposing faces identical cam-slots 70. 71 represents adjustable cam-rods suspended from the shafts 68, each carrying a cam-roller 72, which is located in the cam-slot 70. The cam-rod 71 is extended downward and connected through a spring with the plunger-rocker 74, pivoted at 75 in a casting projecting from the pump-frame. It will be understood that when the shafts 68 are rotated (by the action of the pump-regulator) the cams 69 will be correspondingly rotated.

Upon reference to Fig. 10 it will be noted that the cam-slot 70 is so shaped that when the cam 69 is turned in the direction of the arrow the cam-rod 71 will be lifted and the head of the plunger-rocker 74 shifted to the left, whereas when the cam is turned in the direction opposite to that of the arrow no motion will be imparted to the cam-rod or plunger-rocker.

From the above it will be readily understood that if all the cam-disks of one pump unit are so disposed relative to the shafts 68 of that unit a movement of these shafts in a certain direction—i. e., from left to right—will produce a corresponding movement of such cam-disks. Such movement will lift the cam-rods and simultaneously open all the by-pass valves of such pump unit. It will also be understood that if the cam-disks 69 of the opposite unit are rotated through the shafts 68 of that unit in an opposite direction—i. e., from right to left—the cam-rods will not be lifted and the by-pass valves not opened. It will be further understood that the rotation of the disks 69 is alternately in opposite directions. In other words, the pump-regulator oscillates the shaft 57 through a given arc, and the movement of this shaft is transmitted through the shafts 64 64ª to the shafts 68, thence to the disks 69 and through the disks to such of the cam-rods as are in a position to be actuated by the movement of the disk at the time.

The top of the plunger-rocker 74 carries the reciprocating pins 76 77. The pin 77, it will be observed, is shorter than the pin 76, and each of these pins is spring-retracted. The purpose of making the pin 77 shorter than the pin 76 is in order that room may be provided to permit forward movement of the horizontal arm $q$, as hereinafter described.

Referring now to Figs. 8, 9, 10, 11, and 13, the pistons 13 13' of each pump, as before described, are connected together by means of the rods 14. These rods move in guides S on each end of the pump-frame, (one shown,) and secured to the rods 14 on one side of each pump is a casting 78, which carries in its lower extremity the two adjustable striking-pins 79 80.

Referring now to Figs. 11 and 12, pivotally mounted at 81 on a casting 82, connected to the engine-frame, is an oscillating lever T, and situated between the side plates of this lever is a latch-plate $l$. The lever T is connected to the dash-pot U through the parallel rods $k$. Pivoted to the casting 82 at $n$ is a latch V. The forward end of the latch is provided with a latch-head $m$, which lies over the latch-plate $l$ in the lever T. The latch is normally maintained in the position shown by means of the spring $o$. The opposite end $p$ of the lever is connected to the horizontal rod $q$, slotted at $r$ to receive and within which the bolt $s$ in the top of the lever T may freely move. Mounted upon the upper end of the inner plate T' of the lever is a striking-plate $T^2$. The upper end of the lever T is connected through the rod $j$ to the arm $i$ of the bell-crank $g$, which operates the by-pass valve to which it is connected.

The position of the various parts shown in Figs. 8, 9, 10, 11, 12, and 13 is that which they will occupy when the by-pass valves are closed.

It will be understood that the casting 78, secured to the rod 14, is reciprocated with the rod and in unison with the motion of the pump-pistons and that with the parts in the position shown the short reciprocating pin 77 in the plunger-rocker 74 will be in line with the striking-pin 80, and the cam-rod 71 will be in its lowest position. If now the work in the fluid-circuit is increased beyond the economical capacity of the engine, with both pump units at work, the cams 69 will be rotated, the cam-rod 71 lifted, and the plunger-rocker 74 shifted to bring the long reciprocating pin 76 in line with the striking-plate $T^2$ on the lever T and with the striking-pin 79, with the result that when the casting 78 is moved forward the pin 79 will strike the reciprocating pin 76, which in turn strikes the striking-plate $T^2$ of the lever T, thereby shifting the lever backward to the position shown in the dotted lines, Fig. 11. As the lever T moves backward the end $m$ of the latch V moves downward under the influence of the spring $o$ until an opening in the bottom of the latch takes over the latch-plate $l$. At the same time the slotted plate $q$ of the latch V is moved forward. When the lever T is moved backward, as described, it, through the rods $k$, compresses the spring of the dash-pot U and at the same time makes traction upon the rod $j$, which transmits its motion to the lever $i$ of the bell-crank $g$, the upper lever of which, $h$, acting upon the stem $a$ of the by-pass valve N, opens the valve. The relation of these parts is such that this action takes place as the pump-pistons are moved outward in drawing fluid into the pump-cylinders, the effect of which is to release the by-pass valves N of any pressure from above.

As before stated, the controlling apparatus for the by-pass valves of a pump unit are operated simultaneously. Consequently, assuming the pump unit B B' to be affected, all of the four by-pass valves connecting the four single-acting pumps of this unit to the tank C will be opened by the reciprocations of the pumps; but the by-pass valves of the other pump unit will not be opened by the reciprocation of the pumps to which they are connected by reason of the fact that at this time the cams 69 of this unit $B^2 B^3$ are being rotated in a direction opposite to that of the cams of the unit B B'.

I have described the operation by reason of which the by-pass valves of one unit are opened. I will now describe how they are closed. When the resistance in the fluid-circulating system is reduced, with the by-pass valves of one unit open, the cams 69 of the pump units are again rotated, but in reverse direction from that in which they were previously rotated. This second rotation or oscillation restores the reciprocating pins 76 77 to the position shown in the figures, but with plate $q$ of the latch V thrown forward. When the casting 78 moves forward, the pin 80 strikes the pin 77 in the plunger-rocker, which in turn strikes the end of the plate $q$ of the latch V, driving it backward, thereby raising the end $m$ of the latch V and releasing the lever T, which is thrown forward by the action of the spring of the dash-pot U, which motion is transmitted, through the rod $j$, to the valve N, closing the valve upon its seat and restoring all of the parts to their original position.

The object of interposing a spring between the cam-rod 71 and the plunger-rocker 74 is for the purpose of insuring the movement of the rocker should one of the pins 79 80 happen to be in the way when the cam-rod is lifted. In such case the rocker would be held out of its position until the casting 78 moved backward, when the spring 73 (the rod 71 having finished its movement) would throw the rocker into the required position.

Bearing in mind now the previous description of the operation of the pump-controller and its successive step-by-step movement through arcs of ninety degrees and the interposed connections between the pump-controller, the shaft 57, shafts 64 64ª, and shafts 68, the various movements by reason of which the by-pass valves of the pump units are successively opened and closed will be readily understood.

I wish it understood that I do not limit myself to the precise mechanism described for opening and closing the by-pass valves in connection with the pump-controller, as other apparatus may be used in connection with the pump-controller described or an equivalent pump-controller which will embody the intent of my invention.

In this specification I have not entered into any extended description of the circulating system or the means employed for controlling the fluid-pressure at the draw-bench or other device at which the fluid-pressure is employed, as I have not considered it necessary to do so in view of the fact that circulating systems of various types, as well as controlling-valves, have heretofore been employed, and the general arrangement of piping, &c., can be modified indefinitely.

By the term "pump-controller" as used in the claims I refer to that portion of the apparatus embodied in Figs. 3 to 6, as also the rocker 74 and the connections between the rocker and the shaft 57, and by the term "by-pass apparatus" I refer to the reciprocating casting 78 and the mechanism between it and the valve N, governed in its action on the valve N by the pump-controller.

By the expression "energized" where used in the claims I wish to have it understood as referring to the functional energizing of the parts irrespective of whether or not a portion of the device said to be energized is or is not continually in motion.

Having thus described my invention, I claim—

1. A fluid-pressure system, comprising a prime motor operated at approximately constant speed, a series of fluid-pressure devices, a fluid-circulating system including said devices, means controlled by the speed of the prime motor for cutting one or more of said fluid-pressure devices out of circuit and diverting the whole power of the prime motor to the remaining fluid-pressure devices.

2. In a fluid-pressure system, the combination of a prime motor operated at approximately constant speed, a series of pump units having reciprocating plungers, a series of by-pass valves, mechanism interposed between the pump-plungers and the by-pass valves for actuating said by-pass valves, and a pump-controller energized by variations of work resistance in the circulating system, for controlling the time of movement of the by-pass valves.

3. In a fluid-pressure system, the combination of a prime motor operated at approximately constant speed, a series of pump units having reciprocating plungers, a fluid-circulating system, a pump-controller energized by variations of work resistance in the circulating system, and by-pass apparatus adapted to be actuated by the movement of the pump-plungers, said pump-controller and by-pass apparatus being constructed and arranged to throw the by-pass apparatus into or out of action when the pump-plungers are leaving the pump-cylinders.

4. In a fluid-pressure system, the combination of a prime motor operated at approximately constant speed, a series of pump units, a fluid-circulating system, a pump-controller energized by variations in speed of the prime motor, and by-pass mechanism connected to and moved by each pump, said pump-controller and by-pass mechanism being constructed and arranged for throwing the by-pass mechanism successively into or out of operation as the speed of the prime motor is varied by changes of load in the fluid-circulating system.

5. In a fluid-pressure system, the combination of a prime motor operated at approximately constant speed, a series of pump units, a fluid-circulating system, a pump-controller energized by work resistance in the circulating system, and mechanism governed by said pump-controller which will stop and start the fluid-delivery from the respective pump units alternately in accordance with the work resistance in the circulating system.

6. In a fluid-pressure system, the combination of a prime motor operated at approximately constant speed, a series of pump units, a fluid-circulating system, a pump-controller thrown into and out of action by variations of speed of the prime motor, and mechanism governed by the pump-controller for varying the number of pump units retained in action under varying conditions of load.

7. In a fluid-pressure system, the combination of a prime motor operated at approximately constant speed, a series of pump units, and a device actuated by the prime motor and interposed between the prime motor and the pump units, which will vary the number of effective pump units in accordance with the load on the prime motor.

8. In a fluid-pressure system, the combination of a prime motor operated at approximately constant speed, a series of pump units, a by-pass apparatus connected to each pump of said pump units, and a pump-controller actuated by the prime motor and interposed between the prime motor and the by-pass apparatus of the pump units, which will open and close the by-pass apparatus of a pump unit in accordance with the load on the prime motor.

9. In a fluid-pressure system, a pump-controller having a step-by-step movement, a series of pump units, and a series of by-pass apparatus corresponding in number with the pump units; the pump-controller being constructed and arranged to alternately open and close the by-pass apparatus of first one pump unit and then that of the other.

10. In a fluid-circulating system, a pump-controller comprising a horizontally-disposed driven shaft, a vertical shaft geared to said driven shaft, governor-balls mounted on the end of said vertical shaft and connected to a vertically-moving collar, a motor apparatus driven from said horizontal shaft and comprising a rotating ring gear carrying laterally-projecting pins and a tension-band, a disk having two sets of laterally-projecting pins and a cam-slot, and a second disk having a radial slot; a sliding bolt, a roller which takes in said cam-slot of said first-named disk, a vertically-moving transversely-slotted bolt, a pivoted lever to which the bolt is connected, and a rod interposed between said lever and said collar on vertical shaft, substantially as described.

11. In a fluid-circulating system, a pump having a reciprocating piston, a rod connected to said piston and reciprocating with it, a casting carrying striking-pins connected to said rod, a by-pass apparatus located in the suction of said pump, and mechanism interposed between said striking-pins and said by-pass apparatus, whereby the said by-pass apparatus may be opened and closed.

12. In a fluid-circulating system, a pump having a reciprocating piston, a rod carried by said piston, a casting carrying striking-pins connected to said rod, a pivoted lever in the path of movement of the striking-pins, a valve actuated by said lever, a latch device, and a rocker carrying reciprocating pins having a transverse movement to said striking-pins and said lever, substantially as described.

13. In a fluid-circulating system, the combination of a pump having a reciprocating plunger, a rod connected to the plunger, a casting carrying striking-pins, a pivoted lever, a latch, a rocker and its pins, a dash-pot connected to said lever, a by-pass valve, a spring-sleeve surrounding said valve, a bell-crank lever, and a rod connecting said pivoted lever to said bell-crank, substantially as described.

14. In a fluid-circulating system, the combination of a series of pump units, a controller for said pump units having among its parts a series of oscillating shafts carrying cam-disks and cam-rods, a reciprocating rocker, and a series of by-pass apparatus, each of said by-pass apparatus having among its parts longitudinally-reciprocating pins, a lever adapted to be actuated by said reciprocating pins, and connecting mechanism between said lever and a by-pass valve.

15. In combination with a draw-bench, a prime motor operated at approximately constant speed, a series of pump units, a fluid-circulating system, including said pump-units and draw-bench, a controlling-valve at the draw-bench, and a device energized by variations in speed of the prime motor, which will vary the number of pump units in accordance with the work resistance on the draw-bench.

16. In combination with a pump, by-pass mechanism constructed and arranged to be actuated by the pump, and automatic mechanism independent of the pump for determining when such by-pass mechanism shall be opened and closed.

In testimony whereof I affix my signature in the presence of two witnesses.

JOHN FRANCIS ELLIS.

Witnesses:
J. E. PEARSON,
W. H. PUMPHREY.